United States Patent
Shikoda et al.

(10) Patent No.: US 6,633,018 B2
(45) Date of Patent: Oct. 14, 2003

(54) LASER WELDING HEAD WITH ASSOCIATED ROLLER

(75) Inventors: Shigekazu Shikoda, Akashi (JP); Tetsuya Kubota, Kobe (JP); Hirotaka Uehara, Ashiya (JP); Osamu Satoh, Akashi (JP); Tomoyuki Uno, Kobe (JP); Takayuki Murata, Akashi (JP); Mamoru Nishio, Kobe (JP)

(73) Assignee: Kawasaki Jukugyo Kabushiki Kaisha, Kobe ( * ) Notice: Subject to any disclaimer, the term of this patent is extended or adjusted under 35 U.S.C. 154(b) by 0 days.

(21) Appl. No.: 10/020,189

(22) Filed: Dec. 18, 2001

(65) Prior Publication Data

US 2002/0079295 A1 Jun. 27, 2002

(30) Foreign Application Priority Data

Dec. 25, 2000  (JP) ........................................ 2000-392086

(51) Int. Cl.⁷ .............................................. B23K 26/20
(52) U.S. Cl. .................................................. 219/121.63
(58) Field of Search ...................... 219/121.63, 121.64, 219/121.84

(56) References Cited

U.S. PATENT DOCUMENTS 5,142,118 A * 8/1992 Schlatter ................ 219/121.63
5,731,566 A * 3/1998 Steinhart ................ 219/121.63

FOREIGN PATENT DOCUMENTS

| DE | 4403999 A1 | * | 8/1995 |
| FR | 2636554 A1 | * | 3/1990 |
| JP | U 63-101187 | | 7/1988 |
| JP | A 3-57580 | | 3/1991 |
| JP | U 4-80682 | | 7/1992 |
| JP | A 5-337669 | | 12/1993 |
| JP | A 10-113783 | | 5/1998 |
| JP | A 11-226763 | | 8/1999 |
| JP | 2000-237887 A | * | 9/2000 |
| JP | 2000-288756 A | * | 10/2000 |

* cited by examiner

Primary Examiner—Geoffrey S. Evans
(74) Attorney, Agent, or Firm—Oliff & Berridge, PLC.

(57) ABSTRACT

A laser-welding head is capable of applying a fixed pressure to parts to be welded of workpieces regardless of the undulation of the surfaces of the parts to be welded. The laser-welding head includes a pressing device (12) having a roller (16) which rolls along parts of workpieces near a weld line (40) to press together the same parts of the workpieces, a pressing unit (6) for applying a predetermined pressure to the pressing device (12) to press the pressing device (12) toward the parts of the workpieces near the weld line (40), and a laser beam projecting unit (17) mounted on the pressing unit (6) for movement together with the pressing device (12). The pressing unit (6) is provided with a pneumatic cylinder actuator for applying the predetermined pressure to the pressing device (12).

16 Claims, 3 Drawing Sheets

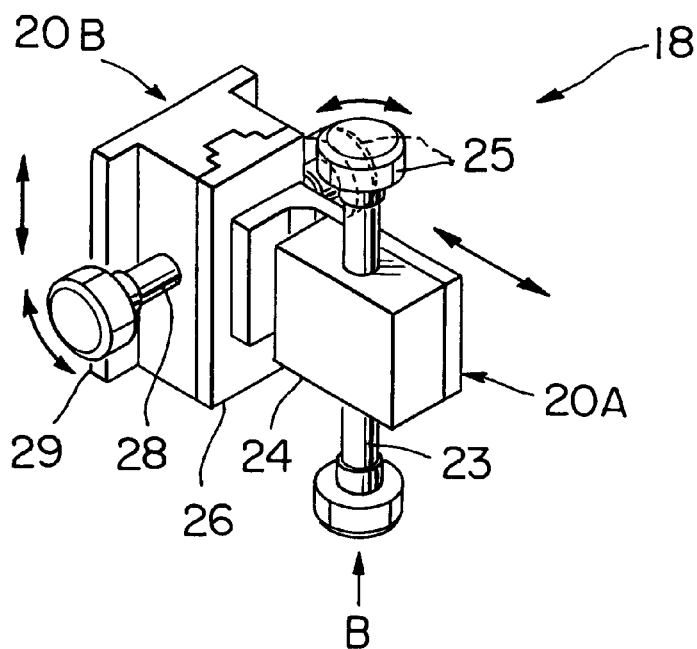
F I G. 3A
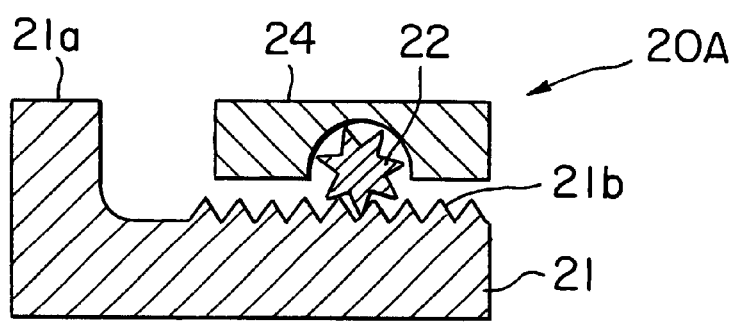
F I G. 3B
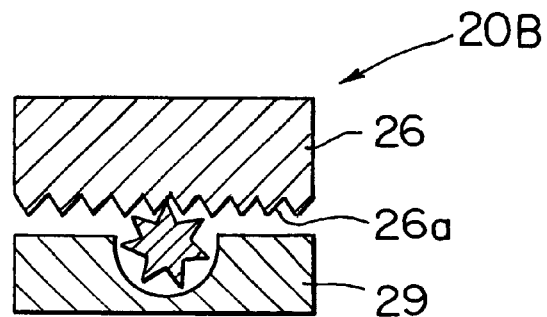
F I G. 3C

LASER WELDING HEAD WITH ASSOCIATED ROLLER

BACKGROUND OF THE INVENTION

1. Field of the Invention

The present invention relates to a laser-welding head. More specifically, the present invention relates to a laser-welding head capable of pressing overlapping workpieces close together for welding, such as lap welding for welding together component members of an automotive body.

2. Description of the Related Art

When welding together two overlapping steel sheets by lap welding which presses the two overlapping steel sheets close together and irradiates overlapping parts of the steel sheets with a laser beam, such as lap welding for welding overlapping component members of an automotive body, a welding head capable of pressing together overlapping workpieces and of welding the overlapping workpieces is attached to the extremity of, for example, the robot arm of a laser-welding robot, and the laser-welding robot moves the welding head along a weld line previously taught to the laser-welding robot various laser-welding heads have been proposed.

A laser-welding machine proposed in JP-A No. Hei 3-57580 is provided with a pressing unit including a roller for pressing parts of workpieces near a weld line along which a spot of a laser beam emitted by a laser unit is moved, and a spring for pressing the roller against the workpieces.

A laser-welding robot proposed in JP-U No. Hei 4-80682 includes a movable rolling member, a cylinder actuator holding the rolling member for vertical movement, and a stationary rolling member supported at a fixed position opposite to a head. Overlapped workpieces are held between the movable rolling member and the stationary rolling member for welding.

A laser-welding method proposed in JP-A No. Hei 10-113783 uses a local pressing unit including a pressing cylinder actuator and a steel ball, and welds together workpieces pressing the workpieces by the local pressing unit.

When welding workpieces together by the laser-welding machine proposed in JP-A No. Hei 3-57580, however, the spring is strained according to the vertical undulations of portions of the workpieces along a weld line and the pressure applied to the roller varies accordingly. Consequently, the roller is unable to apply a fixed pressure to the workpieces. Such a problem may be solved by using a constant-force spring. However, a constant-force spring having a large loading capacity on the order of 100 kgf is very large and hence it is difficult to incorporate such a large constant-force spring into the laser-welding machine. Moreover, the pressure to be applied to the workpieces by the constant-force spring is unadjustable.

The laser-welding robot proposed in JP-U No. Hei 4-80682 and the laser-welding method proposed in JP-A No. Hei 10-113783 need a large cylinder actuator and a large space for installing the large cylinder actuator, and need complicated control operations using a control valve for controlling the cylinder actuator having a large stroke capacity for minute actions.

SUMMARY OF THE INVENTION

The present invention has been made in view of the foregoing problems in the prior art and it is therefore an object of the present invention to provide a laser-welding head capable of applying a constant pressure to parts of workpieces to be welded together regardless of the undulation of the parts of the workpieces to be depressed and of adjusting the constant pressure to be applied to the parts of the workpieces to a desired level.

According to the present invention, a laser-welding head comprises a pressing device capable of moving along parts of workpieces near a weld line to press together the same parts of the workpieces, a pressing unit for applying a predetermined pressure to the pressing device to press the pressing device toward the parts of the workpieces near the weld line, and a laser beam projecting unit mounted on the pressing unit for movement together with the pressing device, wherein the pressing unit includes a pneumatic cylinder actuator for applying the predetermined pressure to the pressing device.

In the laser-welding head, it is preferable that the pressing unit includes a support member and a movable member capable of moving relative to the support member, the pneumatic cylinder actuator has an air cylinder supported on the support member, and a piston rod having one end fastened to the movable member, the pressing device is supported on the movable member, and the laser beam projecting unit is mounted on the movable member.

Preferably, the pneumatic cylinder actuator is connected to an air-pressure control means, and the air-pressure control means controls the pressure of compressed air supplied to the pneumatic cylinder actuator to apply a desired pressure to the movable member.

Preferably, the movable member is movable relative to the support member along a linear guide formed on the support member.

Preferably, the stroke of the piston rod of the pneumatic cylinder actuator is smaller than the diameter of the pressure-bearing surface of the piston rod.

Preferably, the stroke of the piston rod of the pneumatic cylinder actuator is in the range of 1 to 5 cm.

Preferably, the support member is mounted on the extremity of a robot arm.

Preferably, the position of the laser beam projecting unit on the pressing unit is adjusted by a fine-adjustment device.

Preferably, the fine adjustment device consists of first and second fine-adjustment mechanisms for moving the laser beam projecting unit laterally with respect to the weld line and moving the same vertically.

Preferably, the laser beam projecting unit is held on the pressing unit by the fine adjustment device so as to be movable relative to the position of the pressing device.

Preferably, the pressing device has a roller.

Preferably, the roller is supported with its flat side surface inclined at a predetermined angle to a direction in which a laser beam projected by the laser beam projecting unit travels.

Preferably, the roller is supported such that the flat side surface thereof extends along the profile of the focused laser beam projected by the laser beam projecting unit.

Preferably, the part of the workpiece with which the roller comes into contact is exposed to the laser beam when the laser beam is not focused.

Preferably, the pressing device has a roller support structure fixed to the movable member, and a roller supported for turning on the roller support structure.

Preferably, the roller support structure includes an upper member having an L-shaped cross section, an intermediate member having a substantially L-shaped cross section, having an inclined surface inclined outward with respect to the movable member, and joined to the upper member, and a roller support member joined to the inclined surface of the intermediate member to support the roller with its flat side surface inclined to a vertical.

Preferably, the laser beam projecting unit projects a laser beam emitted by a YAG laser.

Preferably, the pressing unit is mounted on the extremity of a robot arm.

Preferably, parts to be welded together are overlapping parts of first and second workpieces.

According to the present invention a robot is provided with the laser-welding head according to the present invention.

The laser-welding head of the present invention is capable of always applying a fixed pressure to the parts of the workpieces to be welded, of applying a pressure to the workpieces and of varying the pressure, and can be formed in compact construction.

BRIEF DESCRIPTION OF THE DRAWINGS

FIG. 3(a) is a perspective view of a fine adjustment device included in the laser-welding head in the preferred embodiment;

FIG. 3(b) is a sectional view of a first fine adjustment mechanism included in the fine adjustment device of FIG. 3(a) taken in the direction of the arrow B in FIG. 3(a); and FIG. 3(c) is a longitudinal sectional view of a second fine adjustment mechanism included in the fine adjustment device of FIG. 3(a).

DESCRIPTION OF THE PREFERRED EMBODIMENTS

A laser-welding head in a preferred embodiment according to the present invention will be described by way of example with reference to the accompanying drawings.

Figure 1:
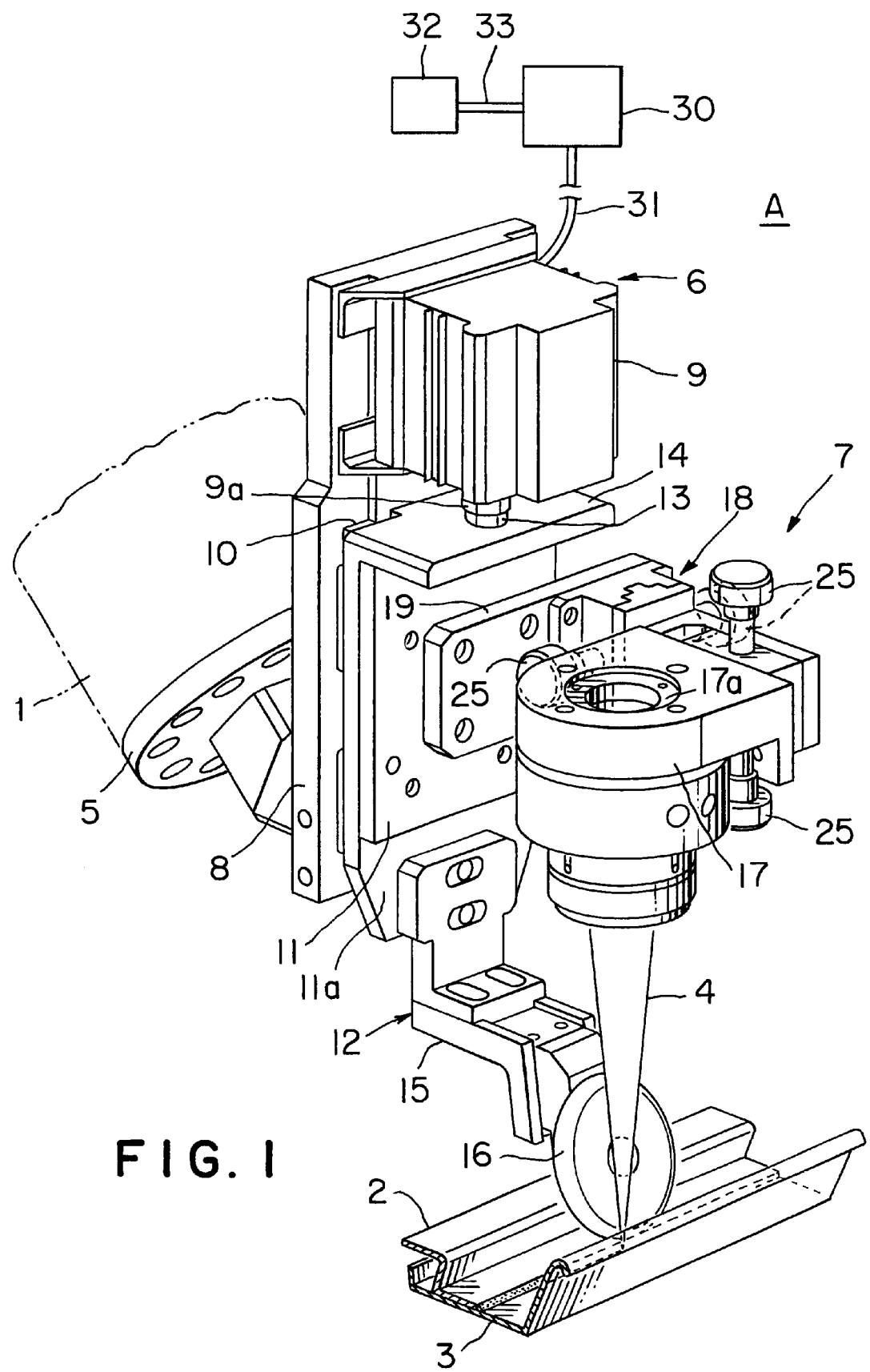
FIG. 1 is a perspective view of a laser-welding head in a preferred embodiment according to the present invention.

Referring to FIG. 1 showing a laser-welding head (hereinafter referred to simply as "welding head") A in a perspective view, the welding head A is mounted on the extremity 1 of a robot arm of a welding robot to press parts of overlapping workpieces near a weld line during welding. More specifically, the welding head A presses overlapping parts of a first workpiece 2 and a second workpiece 3, such as steel plates, extending along a weld line while the first workpiece 2 and the second workpiece 3 are welded together with a laser beam 4. The welding head A includes, as essential components, a joining member 5, a pressing unit 6 mounted on the joining member 5, and a laser-welding unit 7 mounted on the pressing unit 6.

The joining member 5 is a flange matching a flange fixed to the extremity of the robot arm 1. The joining member 5 holding the pressing unit 6 is attached to the extremity of the robot arm 1.

The pressing unit 6 has a support member 8, a pneumatic cylinder actuator 9 held on an upper part of the support member 8, a movable member 11 capable of vertically moving along a vertical, linear guide 10 formed on the support member 8, and a pressing device 12 fixed to a lower part 11a of the movable member 11.

The support member 8 is mounted on the joining member 5 so as to be substantially vertical to the surfaces of parts of the workpieces 2 and 3 to be welded during a welding operation.

The pneumatic cylinder actuator 9 has an air cylinder 9b and a piston rod 9a. The air cylinder 9b is attached to the support member 8. The lower end 13 of the piston rod 9a is fixed to the movable member 11.

As shown in FIG. 1, the pneumatic cylinder actuator 9 is a short-stroke cylinder actuator of a short length having a flat upper surface. When the pneumatic cylinder actuator 9 is viewed from above, the vertical movement of the piston rod 9a can be hardly recognized. The stroke of the piston rod 9a of the pneumatic cylinder actuator 9 is smaller than the diameter of the pressure-receiving surface of the piston rod 9. The stroke is, for example, in the range of 1 to 5 cm. The diameter of the pressure-receiving surface of the piston rod 9a is, for example, in the range of 7 to 12 cm. The diameter of the pressure-receiving surface of the piston rod 9a is equal to the diameter of the piston rod 9a.

The extremity of the piston rod 9a of the pneumatic cylinder actuator 9 is fixedly connected to an upper end part 14 of the movable member 11 to depress the movable member 11. The pneumatic cylinder actuator 9 is connected by a pipe 31 to a pressure regulator 30 (air pressure control means) connected by a pipe 33 to a compressor 32, i.e., a compressed-air source. The pressure regulator 30 regulates the pressure of compressed air to be supplied to the pneumatic cylinder actuator 9 at a desired pressure. Thus, the pressure of the compressed air can be easily adjusted to a desired pressure and the compressed air of a desired pressure can be continuously supplied to the pneumatic cylinder actuator 9. Consequently, the movable member 11 is always urged by a fixed pressure applied thereto by the pneumatic cylinder actuator 9, the pressure exerted by the pneumatic cylinder actuator 9 can be changed. The pneumatic cylinder actuator 9 is capable of exerting a large pressure of, for example, 100 kgf.

The movable member 11 having the upper end part 14 fixedly connected to the extremity 13 of the piston rod 9a of the pneumatic cylinder actuator 9 can be moved vertically along the linear guide 10 on the support member 8 by axially moving the piston rod 9a of the pneumatic cylinder actuator 9. The laser-welding unit 7 is connected to an appropriate part, such as a central part, of the surface of the movable member 11.

The pressing device 12 includes a roller support structure 15 fixed to a lower part 11a of the movable member 11, and a roller 16 supported for rotation on the roller support structure 15.

Figure 2:
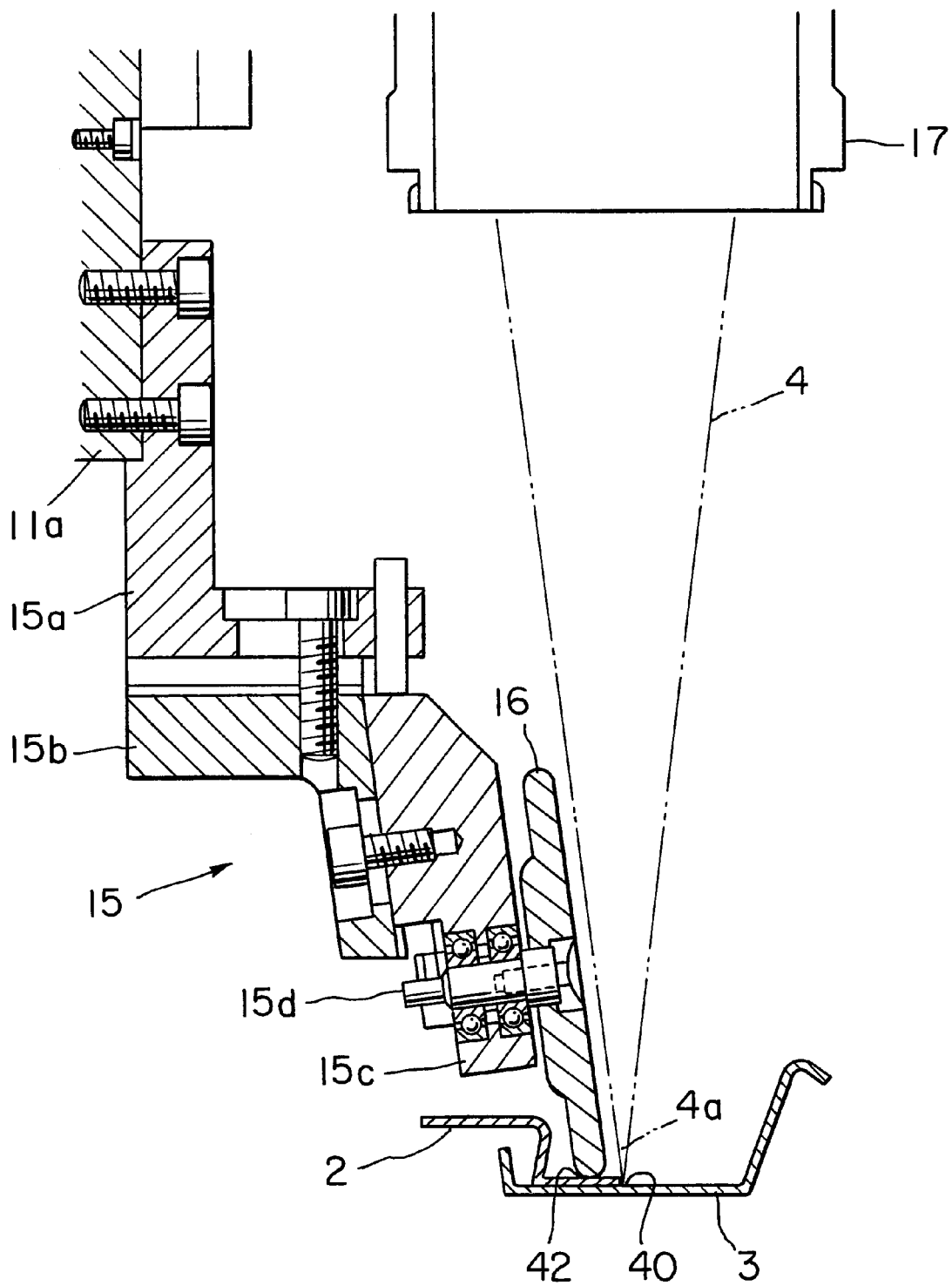
FIG. 2 is an enlarged sectional view of a portion near workpieces of the laser-welding head shown in FIG. 1.

As shown in FIG. 2, the roller support structure 15 includes an L-shaped upper member 15a and an inverted-L-shaped intermediate member 15b joined to the horizontal lower surface of the upper member 15a, and a roller support member 15c joined to an inclined side surface of the intermediate member 15b. An upper part of a vertical wall of the upper member 15a is applied to and fastened with bolts to the lower part 11a of the movable member 11. The inclination of the inclined surface of the roller support member 15c is adjusted so that a flat side surface of the roller 16 extends along a laser beam 4.

The extension of the flat side surface of the roller 16 along the laser beam 4 signifies a state in which the flat side surface of the roller 16 is parallel to the profile of the focused laser beam 4. For example, the flat side surface of the roller 16 is inclined at an angle in the range of 1° to 10° to a vertical. A touching position 42 where the roller 16 touches the workpiece 2 is irradiated with the laser beam 4 if he laser beam 4 is not focused. The touching position 42 is very close to a focal position 4a on which the laser beam 4 is focused in a spot. Since the touching position 42 is very close to the focal position 4a, the roller 16 is able to apply a pressure to parts of the workpieces 2 and 3 very close to a weld line 40 and the laser beam 4 can be always focused at the focal position 4a on the weld line 40.

The upper member 15a and the intermediate member 15b are fastened together with bolts. Slots through which the bolts are passed are formed in the horizontal part of the upper member 15a to enable positional adjustment of the intermediate member 15b relative to the upper member 15a. The intermediate member 15b and the roller support member 15c are fastened together with bolts. Slots through which the bolts are passed are formed in the inclined part of the intermediate member 15b to enable positional adjustment of the roller support member 15c relative to the intermediate member 15b.

The roller support structure thus constructed is capable of supporting the roller 16 at a position near the weld line 40 on which the laser beam 4 is focused for laser welding.

As shown in FIG. 2, the roller 16 is mounted on a shaft 15d supported for rotation in bearings fitted in a hole formed in a lower part of the roller support member 15c coaxially with the shaft 15d. Thus the roller 16 is supported on the roller support member 15c by the shaft 15d. As mentioned above, the roller 16 is supported on the roller support structure 15 such that the flat side surface of the roller 16 is parallel to the profile of the focused laser beam 4. Therefore, the roller 16 is able to apply a pressure to parts of the workpieces 2 and 3 very close to the weld line 40. Since the roller 16 is supported for rotation on the roller support member 15c, the roller 16 is able to roll smoothly along the surface of the workpiece 2.

The laser-welding unit 7 includes a laser beam projecting device 17 capable of projecting the laser beam on the workpieces 2 and 3 welding, a fine-adjustment stage 18 holding the laser beam projecting device 17 and capable of moving the laser beam projecting device 17 laterally and vertically with respect to the weld line 40, and a laser beam projecting device support member 19 holding the fine-adjustment stage 18.

The laser beam projecting device 17 projects, for example, a YAG laser beam (yttrium-aluminum-garnet laser beam) emitted by a YAG laser. A YAG laser beam can be focused in a small spot, which is desirable for precision welding. A YAG laser beam is easy to handle because the same can be transmitted by an optical-fiber cable. An optical-fiber cable may be connected to an upper part 17a of the laser beam projecting device 17, a YAG laser beam may be transmitted through the optical-fiber cable to the laser beam projecting device 17. The YAG laser beam can be thus transmitted by the optical-fiber cable to the laser beam projecting device 17 without using a plurality of mirrors. Thus the laser beam projecting device 17 is simple in construction. The welding head A of the present invention may employ a laser beam other than that emitted by a YAG laser, such as a laser beam emitted by a $CO_2$ laser.

A laser beam 4, such as a YAG laser beam, is transmitted by an optical-fiber cable, not shown, to the upper part 17a of the laser beam projecting device 17. The laser beam projecting device 17 projects the laser beam 4 on parts to be welded of the workpieces 2 and 3. The laser beam 4 is focused on the weld line 40 or at a position lightly in front of or slightly behind the weld line 40.

The laser beam projecting device support member 19 has a holding part holding the fine-adjustment stage 18, and a base part fastened to the movable member 11.

Referring to FIGS. 3(a) to 3(c), the fine-adjustment stage 18 includes a first fine-adjustment mechanism 20A for laterally moving the laser beam projecting device 17 with respect to the weld line 40, and a second fine-adjustment mechanism 20B for vertically moving the laser beam projecting device 17 with respect to the weld line 40.

As shown in FIGS. 3(a) and 3(b), the first fine-adjustment mechanism 20A includes a rack 21 having a base part 21a and provided with teeth 21b, a shaft 23 integrally provided with a pinion 22 which engages the teeth 21b of the rack 21 in its middle part, a slide block 24 holding the shaft 23 for rotation, and knobs 25 attached to the opposite ends of the shaft 23. The slide block 24 is fixed to the laser beam projecting device 17. The base part 21a of the rack 21 is fixed to the second fine-adjustment mechanism 20B. The knob 25 is rotated to move the slide block 24 to the right or to the left together with the laser beam projecting device 17.

As shown in FIGS. 3(a) and 3(c), the second fine-adjustment mechanism 20B includes a slide rack 26 provided with teeth 26a, a shaft 28 integrally provided with a pinion 27 which engages the teeth 26a of the slide rack 26 in its middle part, a base block 29 supporting the shaft 28 for rotation, and knobs 25 attached to the opposite ends of the shaft 28. The base block 29 is fastened to the laser beam projecting device support member 19. The base part 21a of the rack 21 is fixed to the slide rack 26. The knob 25 of the second fine-adjustment mechanism 20B is rotated to move the slide rack 26 vertically to move the laser beam projecting device 17 vertically.

The first fine-adjustment mechanism 20A and the second fine-adjustment mechanism 20B are operated properly to adjust the position of the laser beam projecting device 17 so that the laser beam 4 projected by the laser beam projecting device 17 may fall at a desired position on the workpieces 2 and 3.

The fine-adjustment stage 18 may be of any suitable construction other than the foregoing construction shown in FIGS. 3(a) to 3(c), provided that the fine-adjustment stage 18 is capable of adjusting the vertical and the lateral position of the laser beam projecting device 17 with respect to the weld line 40.

A welding procedure using the welding head A will be described hereinafter.

(1) The knobs 25 of the fine-adjustment stage 18 are operated properly to position of the laser beam projecting device 17 at a desired position. For example, the position of the laser beam projecting device 17 is adjusted such that the laser beam 4 is focused on a part of the workpiece near a part of the same depressed by the roller 16.

(2) The welding robot moves the extremity of the robot arm 1 along a predetermined path taught beforehand to the welding robot to move the welding head A so that the spot of the focused laser beam 4 moves along the weld line 40. An edge of the first workpiece 2 placed on the second workpiece 3 corresponds to the weld line 40 shown in FIG. 2.

(3) The roller 16 is in contact with a part of the surface of the first workpiece 2 near the weld line 40 and rolls along a line parallel to and close to the weld line 40 pressing the first workpiece 2 against the second workpiece 3 to press the first workpiece 2 and the second workpiece 3 close together.

(4) The first workpiece 2 and the second workpiece 3 pressed together by the roller 16 are welded together with the laser beam 4 projected by the laser beam projecting device 17.

(5) Even if the surfaces of parts of the workpieces 2 and 3 extending along the weld line 40 undulate, the roller 16 pressed by the pneumatic cylinder actuator 9 is able to move vertically following the undulating surfaces of the parts of the workpieces 2 and 3.

(6) Since the pressure of the compressed air supplied to the pneumatic cylinder actuator 9 is regulated at a desired level by the pressure regulator 30, a fixed pressure is applied to the workpieces 2 and 3 regardless of the vertical movement of the roller 16.

(7) Since the roller 16 and the laser beam projecting device 17 are fixedly mounted on the movable member 11, the laser beam projecting device 17 moves vertically according to the vertical movement of the roller 16 along the undulating surface of the first workpiece 2, so that the distance between the laser beam projecting device 17 and the weld line 40 remains constant and hence the laser beam 4 is focused always correctly on the weld line 40. Since the parts to be welded of the workpieces 2 and 3 undulate in a narrow range, the stroke of the piston rod 9a of the pneumatic cylinder actuator 9 may be short. Thus the pneumatic cylinder actuator 9 has a small overall length, which is effective in forming the welding head A in small construction.

Thus the welding head of the present invention is capable of applying a fixed pressure to the workpieces regardless of the undulation of the surfaces of parts to be welded of the workpieces. The pressure to be applied by the welding head can be easily adjusted to a desired level and can be increased to a high pressure on the order of 100 kgf. The laser beam can be properly focused on the workpieces even if the surfaces of parts to be welded of the workpieces undulate. Since the lateral and vertical positions of the laser beam projecting device with respect to the weld line can be minutely adjusted by operating the fine-adjustment stage, the position of the spot of the laser beam on the workpieces can be easily changed.

Although the invention has been described in its preferred embodiment, the present invention is not limited thereto in its practical application. For example, a laser beam emitted by a gas laser, such as a $CO_2$ laser, or a laser beam emitted by a semiconductor laser may be used instead of the laser beam emitted by the YAG laser. A steel ball supported for rotation may be employed instead of the roller in pressing the workpieces. Although the welding head of the present invention has been described as being held on the robot arm of the welding robot, the welding head is applicable to various laser-welding machines other than the welding robot.

As apparent from the foregoing description, the welding head of the present invention is capable of achieving laser welding applying a fixed pressure to parts to be welded of workpieces regardless of the undulation of the surfaces of the parts to be welded, of easily adjusting the pressure to be applied to the workpieces to a desired level, and of applying a high pressure on the order of 100 kgf to the workpieces.

Since the roller 16 is supported with its flat side surface inclined at an angle to the direction of travel of the laser beam 4, such as a vertical, the roller 16 is able to apply a pressure to the workpieces at the touching position 42, where the roller 16 touches the upper workpiece, very close to the focal position 4a on which the laser beam 4 is focused. Consequently, the laser beam projecting device 17 is able to focus the laser beam 4 always at the focal position 4a on the weld line 40, and hence it is possible to prevent the deviation of the focal point on which the laser beam 4 is focused from the weld line 40 due to the undulation of the surfaces of parts to be welded of the workpieces.

The welding head is capable of easily changing the focal position on which the laser beam is focused in lateral and vertical directions and hence the welding head is capable of readily dealing with the use of different laser beams.

What is claimed is:

1. A laser-welding head comprising:
   a pressing device capable of moving along parts of workpieces near a weld line to press together the same parts of the workpieces,
   a pressing unit for applying a predetermined pressure to the pressing device to press the pressing device toward the parts of the workpieces near the weld line, and
   a laser beam projecting unit mounted on the pressing unit for movement together with the pressing device,
   wherein the pressing unit includes a pneumatic cylinder actuator for applying the predetermined pressure to the pressing device,
   the pressing unit includes a support member and a movable member capable of moving relative to the support member,
   the pneumatic cylinder actuator has an air cylinder supported on the support member, and a piston rod having one end fastened to the movable member,
   the pressing device is supported on the movable member,
   the laser beam projecting unit is mounted on the movable member, and
   a stroke of the piston rod of the pneumatic cylinder actuator is smaller than a diameter of a pressure-bearing surface of the piston rod.

2. A robot provided with the laser-welding head according to claim 1.

3. A laser-welding head comprising:
   a pressing device capable of moving along parts of workpieces near a weld line to press together the same parts of the workpieces,
   a pressing unit for applying a predetermined pressure to the pressing device to press the pressing device toward the parts of the workpieces near the weld line, and
   a laser beam projecting unit mounted on the pressing unit for movement together with the pressing device,
   wherein the pressing unit includes a pneumatic cylinder actuator for applying the predetermined pressure to the pressing device,
   the pressing unit includes a support member and a movable member capable of moving relative to the support member,
   the pneumatic cylinder actuator has an air cylinder supported on the support member, and a piston rod having one end fastened to the movable member,
   the pressing device is supported on the movable member,
   the laser beam projecting unit is mounted on the movable member, and
   a stroke of the piston rod of the pneumatic cylinder actuator is in the range of 1 to 5 cm.

4. A robot provided with the laser-welding head according to claim 3.

5. A laser-welding head comprising:
   a pressing device capable of moving along parts of workpieces near a weld line to press together the same parts of the workpieces,
   a pressing unit for applying a predetermined pressure to the pressing device to press the pressing device toward the parts of the workpieces near the weld line, and a laser beam projecting unit mounted on the pressing unit for movement together with the pressing device, wherein the pressing unit includes a pneumatic cylinder actuator for applying the predetermined pressure to the pressing device, and a position of the laser beam projecting unit on the pressing unit is adjusted by a fine-adjustment device.

6. A robot provided with the laser-welding head according to claim 5.

7. The laser-welding head according to claim 5, wherein the fine-adjustment device consists of first and second fine adjustment mechanisms for moving the laser beam projecting unit laterally with respect to the weld line and moving the same vertically.

8. A robot provided with the laser-welding head according to claim 7.

9. The laser-welding head according to claim 5, wherein the laser beam projecting unit is held on the pressing unit by the fine adjustment device so as to be movable relative to position of the pressing device.

10. A robot provided with the laser-welding head according to claim 9.

11. A laser-welding head comprising:

a pressing device capable of moving along parts of workpieces near a weld line to press together the same parts of the workpieces, a pressing unit for applying a predetermined pressure to the pressing device to press the pressing device toward the parts of the workpieces near the weld line, and a laser beam projecting unit mounted on the pressing unit for movement together with the pressing device, wherein the pressing unit includes a pneumatic cylinder actuator for applying the predetermined pressure to the pressing device, the pressing device has a roller supported with its flat side surface inclined at a predetermined angle to a direction in which a laser beam projected by the laser beam projecting unit travels, and the roller is supported such that the flat side surface thereof extends along a profile of the laser beam projected and focused by the laser beam projecting unit.

12. A robot provided with the laser-welding head according to claim 11.

13. The laser-welding head according to claim 11, wherein a part of the workpiece with which the roller comes into contact is exposed to the laser beam when the laser beam is not focused.

14. A robot provided with the laser-welding head according to claim 13.

15. A laser-welding head comprising:

a pressing device capable of moving along parts of workpieces near a weld line to press together the same parts of the workpieces, a pressing unit for applying a predetermined pressure to the pressing device to press the pressing device toward the parts of the workpieces near the weld line, and a laser beam projecting unit mounted on the pressing unit for movement together with the pressing device, wherein the pressing unit includes a pneumatic cylinder actuator for applying the predetermined pressure to the pressing device, the pressing unit includes a support member and a movable member capable of moving relative to the support member, the pneumatic cylinder actuator has an air cylinder supported on the support member, and a piston rod having one end fastened to the movable member, the pressing device is supported on the movable member, the laser beam projecting unit is mounted on the movable member, the pressing device has a roller support structure fixed to the movable member, the roller support structure including:
an upper member having an L-shaped cross section,
an intermediate member having a substantially L-shaped cross section, having an inclined surface inclined outward with respect to the movable member, and joined to the upper member, and
a roller support member joined to the inclined surface of the intermediate member to support the roller with its flat side surface inclined to a vertical.

16. A robot provided with the laser-welding head according to claim 15.

\* \* \* \* \*

UNITED STATES PATENT AND TRADEMARK OFFICE
CERTIFICATE OF CORRECTION

PATENT NO.     : 6,633,018 B2
DATED          : December 18, 2001
INVENTOR(S)    : Shigekazu Shikoda et al.

It is certified that error appears in the above-identified patent and that said Letters Patent is hereby corrected as shown below:

<u>Title page,</u>
Item [73], change "Kawasaki Jukugyo Kabushiki Kaisha" to -- Kawasaki Jukogyo Kabushiki Kaisha --.

Signed and Sealed this

Thirteenth Day of January, 2004

JON W. DUDAS
*Acting Director of the United States Patent and Trademark Office*